US011097647B1

(12) United States Patent
Moore

(10) Patent No.: US 11,097,647 B1
(45) Date of Patent: Aug. 24, 2021

(54) CARGO BODY WALL WITH LOGISTICS TRACKS

(71) Applicant: STI Holdings, Inc., Stoughton, WI (US)

(72) Inventor: Steven Paul Moore, Oregon, WI (US)

(73) Assignee: STI Holdings, Inc., Stoughton, WI (US)

( * ) Notice: Subject to any disclaimer, the term of this patent is extended or adjusted under 35 U.S.C. 154(b) by 5 days.

(21) Appl. No.: 16/778,133

(22) Filed: Jan. 31, 2020

(51) Int. Cl.
*B60P 7/08* (2006.01)

(52) U.S. Cl.
CPC .................. *B60P 7/0815* (2013.01)

(58) Field of Classification Search
CPC ......... B60P 7/0815; B60P 7/08; B60P 7/0807; B60P 7/15; B65D 90/0053
USPC ................. 410/104, 106, 108, 109, 112–115
See application file for complete search history.

(56) References Cited

U.S. PATENT DOCUMENTS

| | | | |
|---|---|---|---|
| 2,934,372 A | 4/1960 | Jewell et al. | |
| 3,319,585 A | 5/1967 | Pulcrano | |
| 3,769,917 A | 11/1973 | Snyder et al. | |
| 3,815,500 A | 6/1974 | Glassmeyer | |
| 3,842,755 A | 10/1974 | Carr | |
| 3,842,756 A | 10/1974 | Marulic | |
| 4,266,897 A | 5/1981 | Jensen | |
| 4,344,995 A | 8/1982 | Hammer | |
| 4,437,699 A | 3/1984 | Lewis et al. | |
| 4,940,279 A | 7/1990 | Abott et al. | |
| 5,066,066 A | 11/1991 | Yurgevich et al. | |
| 5,286,079 A | 2/1994 | Zubko et al. | |
| 5,678,715 A | 10/1997 | Sjostedt et al. | |
| 5,683,525 A | 11/1997 | Kemp et al. | |
| 5,860,693 A | 1/1999 | Ehrlich | |
| 5,934,742 A | 8/1999 | Fenton et al. | |

(Continued)

FOREIGN PATENT DOCUMENTS

CA 2363379 A1 * 5/2002 ............... B60P 7/08
DE 10110996 A1 9/2002

(Continued)

OTHER PUBLICATIONS

Whiting airCELL Panels product brochure, publicly available and offered for sale prior to Jun. 4, 2014 (6 pages).

(Continued)

*Primary Examiner* — Stephen T Gordon
(74) *Attorney, Agent, or Firm* — Michael Best & Friedrich LLP

(57) ABSTRACT

A cargo body wall including an interior side defining an interior plane for facing a cargo receiving volume, and an exterior side. A primary logistics track is elongated in a first direction and situated in the cargo body wall, and a secondary logistics track is elongated in a second direction intersecting the first direction. The primary logistics track includes first and second inward expansions projecting inward of the interior plane, each of the first and second inward expansions having at least one opening therein providing access to a logistics fitting accommodation area within the cargo body wall. The secondary logistics track is arranged to cross the primary logistics track at a position between the first and second inward expansions.

11 Claims, 5 Drawing Sheets

(56) References Cited

U.S. PATENT DOCUMENTS

| | | | |
|---|---|---|---|
| 5,934,849 | A * | 8/1999 | Haire .................. B60P 7/0815 410/113 |
| 5,988,074 | A | 11/1999 | Thoman |
| 5,992,117 | A | 11/1999 | Schmidt |
| 5,997,076 | A | 12/1999 | Ehrlich |
| 6,000,342 | A | 12/1999 | Thoman et al. |
| 6,003,932 | A | 12/1999 | Banerjea et al. |
| 6,010,020 | A | 1/2000 | Abal |
| 6,106,205 | A | 8/2000 | Haire |
| 6,412,854 | B2 | 7/2002 | Ehrlich |
| 6,450,564 | B1 | 9/2002 | Sill |
| 6,527,335 | B1 | 3/2003 | Yurgevich |
| 6,578,902 | B2 | 6/2003 | Sill |
| 6,607,237 | B1 | 8/2003 | Graaff et al. |
| 6,626,622 | B2 | 9/2003 | Zubko |
| 6,742,974 | B2 | 6/2004 | Haire |
| 6,893,075 | B2 | 5/2005 | Fenton et al. |
| 6,959,959 | B1 | 11/2005 | Roush |
| 7,014,253 | B2 | 3/2006 | Oren |
| 7,017,253 | B1 | 3/2006 | Riggle |
| 7,069,702 | B2 | 7/2006 | Ehrlich |
| 7,100,971 | B2 | 9/2006 | Pines |
| 7,152,912 | B1 | 12/2006 | Roush et al. |
| 7,422,270 | B2 | 9/2008 | Graaff et al. |
| 7,461,888 | B2 | 12/2008 | Brown |
| 7,500,713 | B2 | 3/2009 | Riley et al. |
| 7,527,325 | B2 | 5/2009 | Yurgevich |
| 7,540,085 | B2 | 6/2009 | Fenton et al. |
| 7,588,286 | B2 | 9/2009 | Lewallen et al. |
| 7,621,589 | B1 | 11/2009 | Gerome |
| 7,704,026 | B2 | 4/2010 | Roush et al. |
| 7,762,618 | B2 | 7/2010 | Lewallen et al. |
| 7,798,753 | B2 | 9/2010 | Yurgevich |
| 7,862,103 | B2 | 1/2011 | Riley et al. |
| 7,931,328 | B2 | 4/2011 | Lewallen et al. |
| 8,006,386 | B2 | 8/2011 | Ehrlich |
| 8,016,152 | B2 | 9/2011 | Roush et al. |
| 8,056,960 | B2 | 11/2011 | Brown |
| 8,186,747 | B2 | 5/2012 | Bloodworth et al. |
| 8,419,110 | B2 | 4/2013 | Katz et al. |
| 8,424,958 | B2 | 4/2013 | Wylezinski et al. |
| 8,506,221 | B2 | 8/2013 | Pattison et al. |
| 8,540,099 | B2 | 9/2013 | Roush |
| 8,652,382 | B2 | 2/2014 | Eggert et al. |
| 8,720,974 | B2 | 5/2014 | Hurst et al. |
| 8,998,295 | B2 | 4/2015 | Katz et al. |
| 9,242,591 | B2 | 1/2016 | Ehrlich |
| 9,314,875 | B2 | 4/2016 | Stephan |
| 9,394,010 | B2 | 7/2016 | Kunkel |
| 9,834,130 | B1 | 12/2017 | Peters |
| 9,884,660 | B2 | 2/2018 | Fenton |
| 9,884,661 | B2 | 2/2018 | Fenton |
| 9,944,334 | B1 | 4/2018 | Kaufmann |
| 10,118,653 | B2 | 11/2018 | Fenton |
| 10,266,098 | B1 | 4/2019 | Cox et al. |
| 10,507,875 | B1 | 12/2019 | Ebnother et al. |
| 10,564,018 | B2 | 2/2020 | Fenton |
| 10,584,992 | B2 | 3/2020 | Fenton |
| 2003/0184120 | A1 | 10/2003 | Buchholz et al. |
| 2008/0134509 | A1 | 6/2008 | Lewallen et al. |
| 2008/0219796 | A1 * | 9/2008 | Yurgevich ............. B60P 7/0815 410/115 |
| 2008/0292898 | A1 | 11/2008 | Straza |
| 2009/0053548 | A1 | 2/2009 | Straza |
| 2013/0224419 | A1 | 8/2013 | Lee et al. |
| 2013/0330521 | A1 | 12/2013 | Ebnoether |
| 2015/0044494 | A1 | 2/2015 | Ebnoether |
| 2015/0353138 | A1 | 12/2015 | Fenton |
| 2017/0036415 | A1 | 2/2017 | Ebnoether et al. |
| 2017/0057561 | A1 | 3/2017 | Fenton |
| 2017/0057562 | A1 | 3/2017 | Fenton |
| 2017/0327310 | A1 | 11/2017 | Ebnoether et al. |
| 2018/0015956 | A1 | 1/2018 | Jaworski et al. |
| 2018/0022263 | A1 | 1/2018 | Meyers |
| 2018/0050523 | A1 | 2/2018 | Pilpel et al. |
| 2019/0039344 | A1 | 2/2019 | Ebnoether |
| 2019/0071135 | A1 | 3/2019 | Fenton |
| 2019/0078920 | A1 | 3/2019 | Fenton |

FOREIGN PATENT DOCUMENTS

| | | |
|---|---|---|
| EP | 0424083 A1 | 10/1990 |
| EP | 2116417 A1 | 11/2009 |

OTHER PUBLICATIONS

TruckingInfo.com, "Trailer Update," downloaded from http://www.truckinginfo.com/article/story/2013/07/trailer-update.aspx, available Jul. 2013, (10 pages).

Trailer-bodybuilders.com, "Mid-America Trucking Show coverage: Newest trailer designs exhibited at MATS,": downloaded from http://trailer-bodybuilders.com/trailers/mid-america-trucking-show-coverage-newest-trailer-, May 1, 2013 (5 pages).

Transport Topics, "Whiting Door Licenses Technology to Make Lightweight Steel Panels," downloaded from http://www.ttnews.com/articles/printopt.aspx?storyid=34581, Mar. 31, 2014 (2 pages).

U.S. Appl. No. 16/527,395, filed Jul. 31, 2019, by Gary L. Fenton.

* cited by examiner

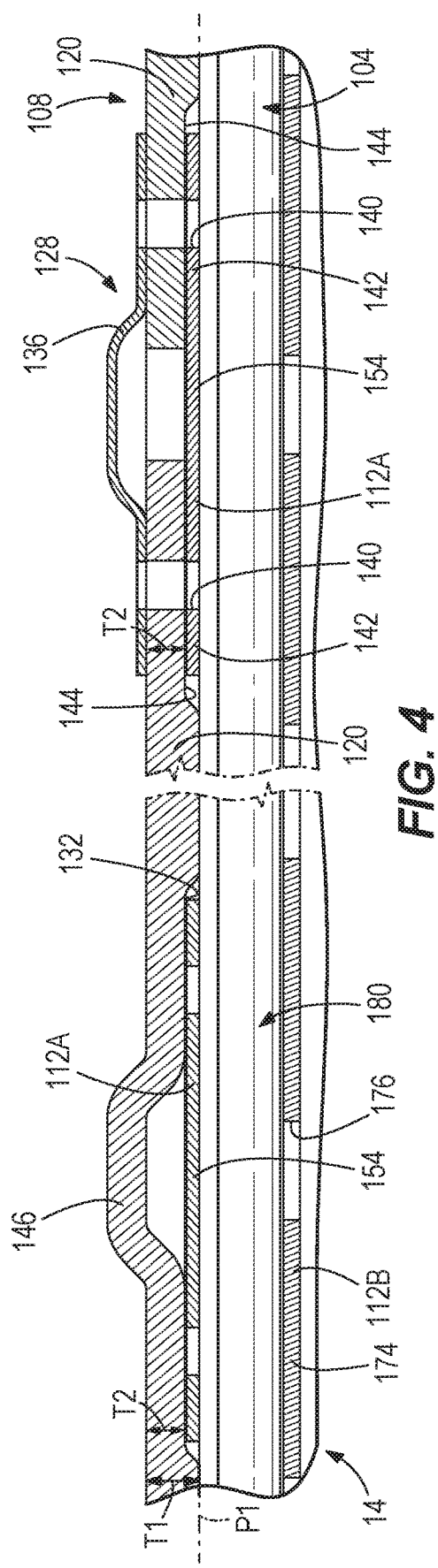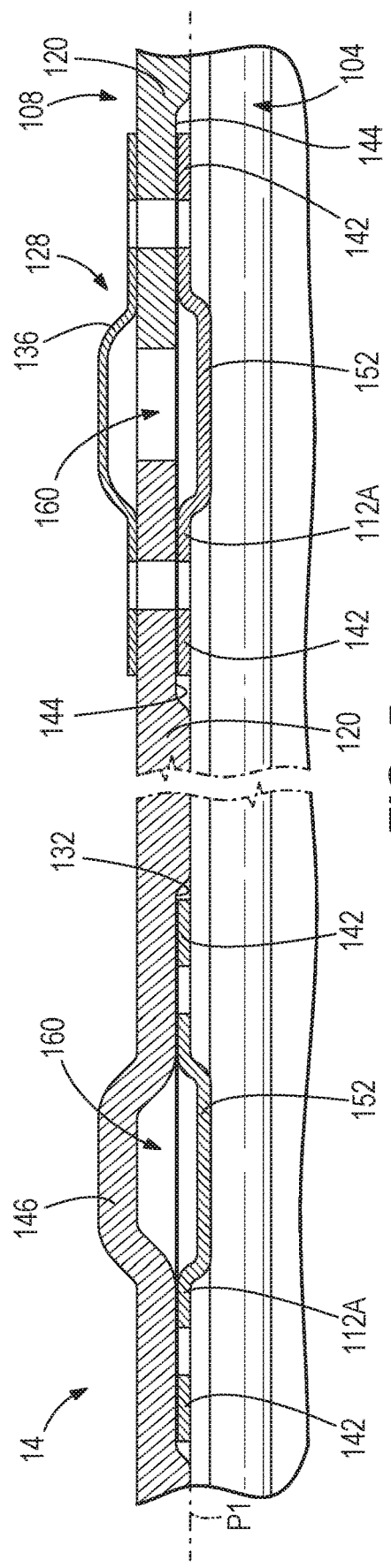
FIG. 4
FIG. 5

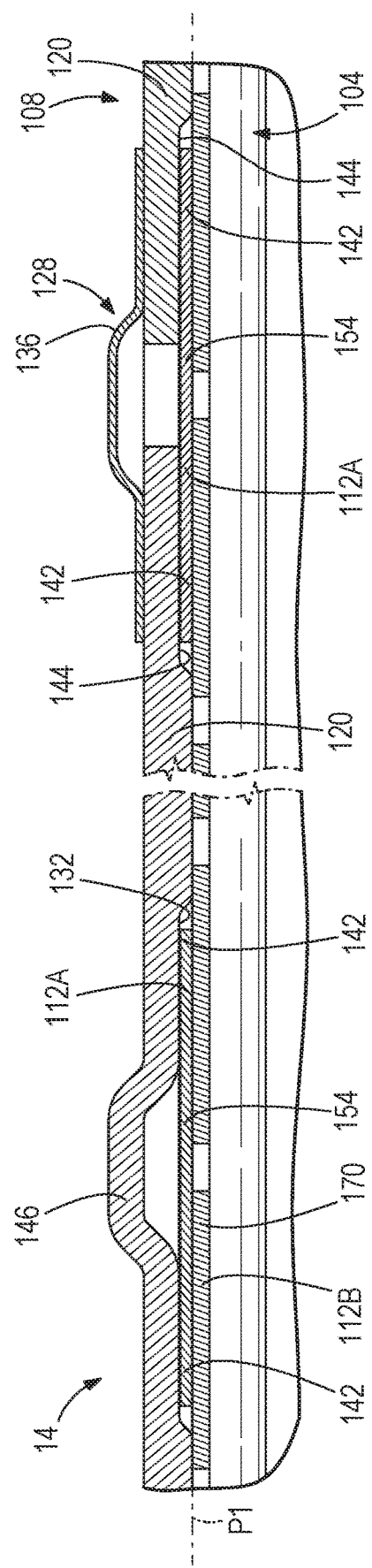

CARGO BODY WALL WITH LOGISTICS TRACKS

BACKGROUND

This disclosure relates to wall construction of cargo containers, such as over-the-road trailers, for example. The disclosure further relates to logistics tracks in such wall construction.

SUMMARY

In one aspect, the invention provides a cargo body wall including an interior side defining an interior plane for facing a cargo receiving volume, and an exterior side opposite the interior side. A primary logistics track is elongated in a first direction and situated in the cargo body wall, and a secondary logistics track is elongated in a second direction intersecting the first direction. The primary logistics track includes first and second inward expansions projecting inward of the interior plane, each of the first and second inward expansions having at least one opening therein providing access to a logistics fitting accommodation area within the cargo body wall. The secondary logistics track is arranged to cross the primary logistics track at a position between the first and second inward expansions.

According to another aspect of the invention, a cargo body wall is configured to provide an upstanding vertical wall of a transport cargo body. An interior side of the cargo body wall is provided by one or more panels for facing a cargo area of the cargo body construction, the interior side defining a wall plane. The interior side includes a network of overlapping vertical and horizontal logistics tracks, including nested logistics tracks set into the interior side of the cargo body wall and surface-mount tracks. Profiles of both the nested logistics tracks and the surface-mount logistics tracks include portions that protrude from the wall plane. The surface-mount logistics tracks lie flush against the nested logistics tracks and flush against the one or more panels.

BRIEF DESCRIPTION OF THE DRAWINGS

FIG. 4 is a cross-sectional view of the wall taken along line 4-4 of FIG. 3.

FIG. 5 is a cross-sectional view of the wall taken along line 5-5 of FIG. 3.

FIG. 6 is a cross-sectional view of the wall taken along line 6-6 of FIG. 3.

DETAILED DESCRIPTION

Figure 1:
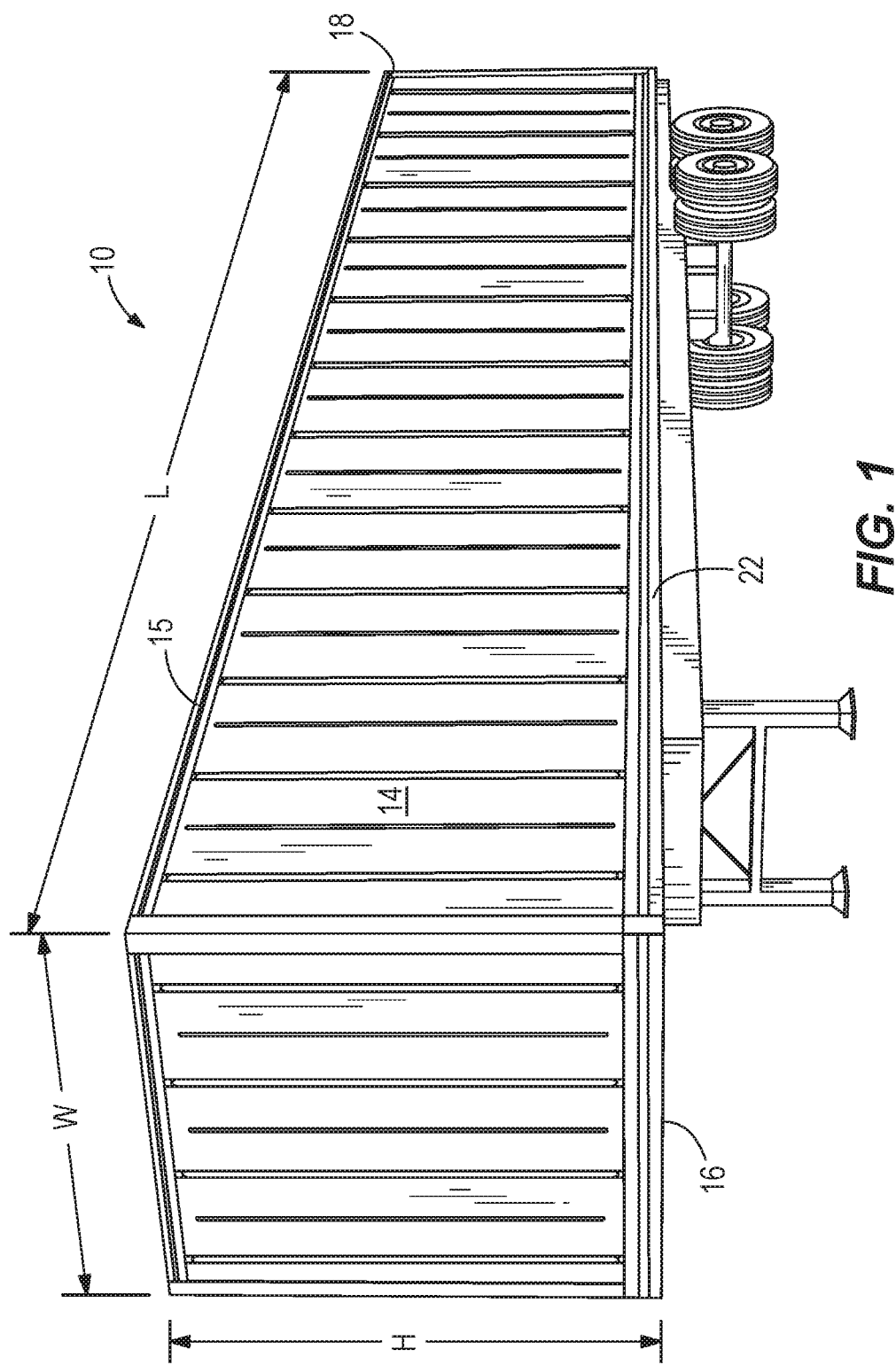
FIG. 1 is a perspective via of a trailer according to an embodiment of the invention.
Figure 2:
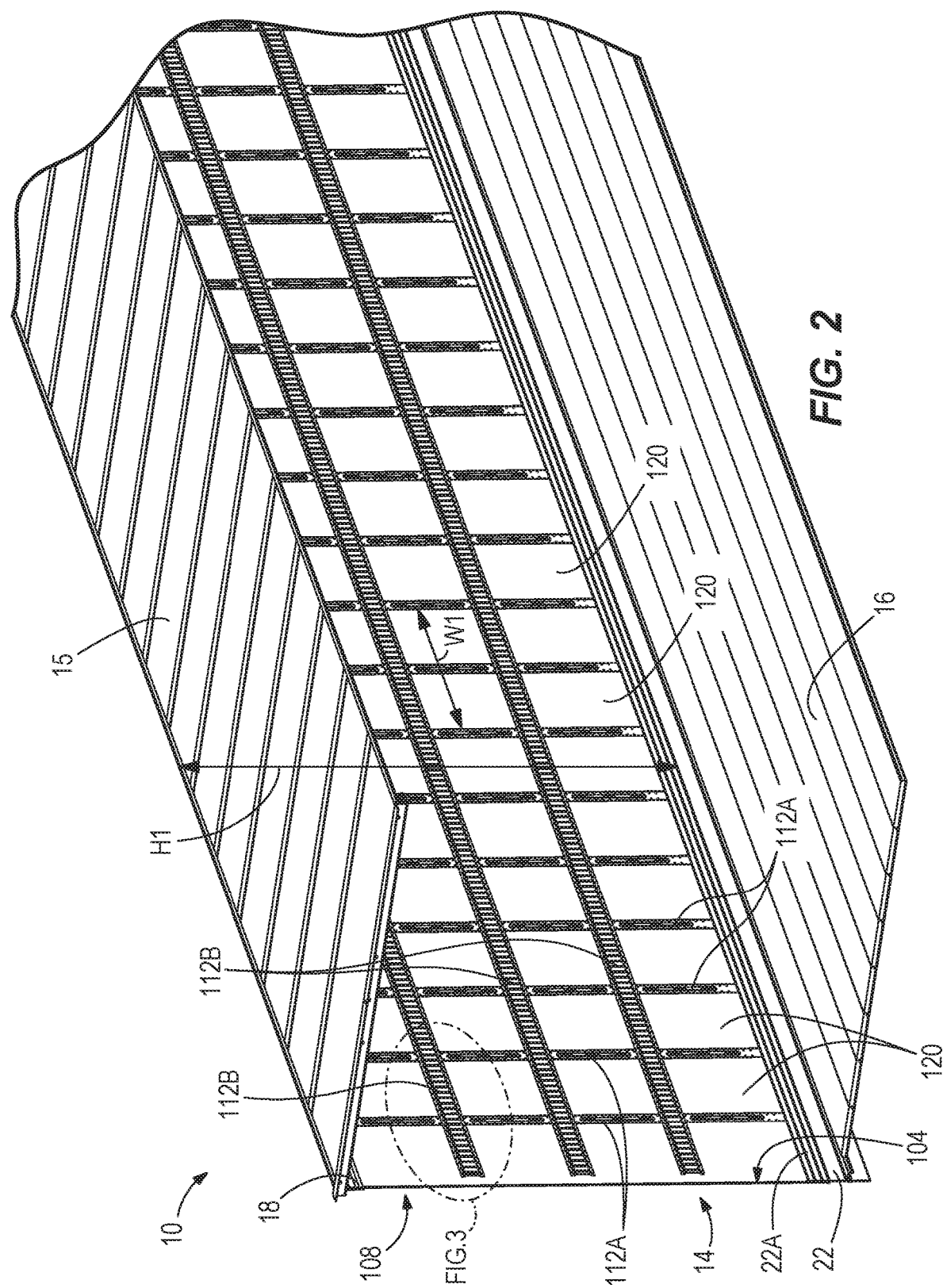
FIG. 2 is a partial cutaway of the trailer of FIG. 1, illustrating an interior side of a wall thereof.

FIGS. 1 and 2 illustrates a trailer 10 for over-the-road use with a truck to transport large cargo volumes. As shown, the trailer 10 is a semi-trailer configured for use with a road tractor (e.g., in forming a so-called 18-wheeler). The trailer 10 includes a chassis having axles with multiple sets of wheels. The trailer 10 defines a length L in a longitudinal or transport direction. Perpendicular to the longitudinal direction, the trailer 10 defines a width W and a height H. The width W cooperates with the length L to define a plan view footprint of the trailer 10, while the height H is measured perpendicular to the footprint (i.e., perpendicular to the ground). Subtracting for wall thicknesses, the length L, the width W, and the height H cooperate to define a cargo receiving interior volume of the trailer 10. The trailer 10 includes a plurality of walls 14, each of which extends along the height H between a roof 15 of the trailer 10 and a floor 16 of the trailer 10. Along each wall 14, a top rail 18 and a bottom rail 22 are provided to flank and secure the upper and lower edges, respectively. The two side walls 14 extend the length L of the trailer 10. As shown in FIG. 2, a scuff band 22A is provided on the wall 14 adjacent the floor 16. The scuff band 22A can optionally be integrated into the bottom rail 22 (e.g., formed as a single monolithic piece, for example metal extrusion). The longitudinal end at the foreground of FIG. 1 (i.e., the forward end) of the trailer 10) can be closed, and the longitudinal end at the background of FIG. 1 (i.e., the rear end of the trailer 10) can be selectively opened or closed by one or more door panels for accessing the interior cargo volume for loading and unloading. Aspects of the invention are not necessarily limited to the semi-trailers as shown in FIG. 1, but also may be applied to vertical walls of other types of trailers, containers, and still other types of transport cargo body configurations, which can include so-called "box trucks" or "straight trucks."

Referring to FIG. 2, the illustrated wall 14 includes an interior side 104 facing the cargo receiving volume of the trailer 10, and an exterior side 108, the interior side 104 having a plurality of logistics tracks, including both vertical tracks 112A and horizontal tracks 112B. In other words, the interior side 104 of the wall 14 includes logistics tracks extending in each of a first direction and a second orthogonal direction. In other embodiments, the vertical and horizontal tracks 112A, 112B extend in directions that are not necessarily orthogonal to each other, but are skewed with respect to one another (i.e., the two directions are non-parallel and moreover intersect with each other within the wall 14) so that the tracks 112A intersect or overlap with the tracks 112B. Each of the illustrated tracks 112A, 112B has a consistent or repeating shape or profile along the predominant direction of elongation, which is referred to as the length or longitudinal direction of the track 112A, 112B, and which may be separate from the length or longitudinal direction of the trailer 10 (as in the case of the vertical tracks 112A). With continued reference to the illustrated embodiment, both of the first and second directions lie along a vertical plane P1 oriented parallel to the longitudinal direction or length L of the trailer 10. The vertical tracks 112A may be referred to as primary logistics tracks, and the horizontal tracks 112B as secondary logistics tracks, it being understood that the terms "primary" and "secondary" do not indicate or imply relative size, shape, or position, or that either is of more importance than the other in function. The illustrated vertical tracks 112A are at least partially embedded or nested into the wall 14. As illustrated, the horizontal tracks 112B are surface-mounted on the wall's interior side 104, and/or on surfaces of the vertical tracks 112A at intersection regions therebetween. Additional details regarding the vertical and horizontal logistics tracks 112A, 112B are described following a general description of the construction of the wall 14.

In some constructions, each wall 14 is constructed of multiple panels (e.g., panels 120 each defining a sheet plane aligned with the plane P1 and arranged edge-to-edge in sequential fashion along the longitudinal direction with vertically-extending joints 124 therebetween). The panels 120 can abut each other at such joints 124 or can be arranged with a gap between adjacent panel edges 120 at the joints 124. In other constructions, each wall 14 may be formed as a singular integral panel throughout the extent thereof. The illustrated wall 14 is formed of an end panel having a first construction at each longitudinal end of the wall 14 and a plurality (e.g., eleven) of intermediate panels therebetween, each of the intermediate panels having a second construction. In some embodiments, the first and second constructions can have the same sandwich construction, but different edging for making the necessary joints. Each wall panel 120 can have a width W1 and a height H1, each of which is orthogonal to a panel depth or thickness T1. The panel thickness T1 is the nominal thickness of the panel 120 that is present at most or all locations in the panel 120 that are spaced away from the joints 128 formed at peripheral panel edges (see example on right side of FIG. 4), and away from a mid-panel recess 132 (example on left side of FIG. 4). In other words, in some embodiments the panel 120 has a thickness and/or shape that does not conform to the simple planar form of the nominal panel thickness T1 at the locations of the primary or vertical logistics tracks 112A.

Also with reference to the illustrated embodiment, first ones of the vertical logistics tracks 112A are located at the joints 128 or "splices" formed between the edges of two adjacent panels 120, while other ones (alternating with the first ones along the trailer length L) are located at the mid-panel recesses 132. At each joint 128, the illustrated panel edges of two adjacent panels 120 are aligned with each other along the plane P1 and sandwiched between one of the vertical logistics tracks 112A (acting as an interior splice plate) and an exterior splice plate 136. As shown in the cross-sections of FIGS. 4-6, a gap may be left between the adjacent panel edges at the joint 128. Each joint 128 may be completed by attachment of the vertical logistics track 112A and exterior splice plate 136 by using one or both of adhesive and mechanical fasteners (e.g., rivets), for example. Fasteners (not shown) may extend through numerous apertures 140 formed in lateral wing or flange portions 142 of the vertical logistics track 112A. The apertures 140 may be aligned with corresponding apertures in the panel edges and the exterior splice plate 136. As shown in FIGS. 4-6, the flange portions 142 are set within recessed edge portions 144 of the panels 120 so that they lie flush with the panel interior surface along plane P1.

The exterior splice plates 136 can be flat or contoured to have a central portion of the cross-section thereof that is extended or bulged to the exterior side. At the locations of the mid-panel recesses 132, the accommodation and attachment of the vertical logistics track 112A can be the same as described for the joints 128, except that one panel 120 has a continuous construction underlying the vertical logistics track 112A and there is no "splice" and thus no exterior splice plate 136. As shown on the left of FIGS. 4-6, the illustrated panel 120 includes an offset portion 146 that is offset to the exterior from the simple planar form defining the thickness T1. The offset portion 146 forms an outward protrusion along the exterior side 108. The offset portion 146, along with the panel portions at the mid-panel recess 132 (and the recessed edge portions 144) can have a thickness less than the thickness T1 (e.g., 0.6*T1 to 0.9*T1). The panels 120 can have a solid or semi-hollow construction, including for example, inner and outer skins that sandwich a core, which can have the same or relatively lower density therebetween to form a composite panel.

Although FIG. 4 illustrates the vertical logistics tracks 112A as lying flush with the plane P1 of the inside panel surface, in some embodiments (including the illustrated embodiment) this is only an arrangement that is realized in localized portions or zones of the vertical logistics track 112A, each of which has a discontinuous cross-section profile along its lengthwise (vertical) direction. The vertical logistics track 112A can be a stamped metal component in some constructions, for example stamped from a uniform-thickness metal sheet or plate. Between the scuff band 22A and the upper rail 18, the illustrated vertical logistics track 112A includes a plurality of inward expansions 152. As illustrated, the inward expansions 152 project inward of the interior plane P1. Also with reference to the illustrated embodiment by way of example only, the inward expansions 152 are limited to a central portion of the cross-section, between the flange portions 142 used for attachment to the panel(s) 120. Thus, as shown in the cross-section of FIG. 5 taken transverse to the vertical direction, the vertical logistics track 112A has a hat-shaped profile at the locations of the inward expansions 152. Part or all of the inward expansions 152 may position at least an entire material thickness inward of the interior plane P1 as shown in FIG. 5. However, in the illustrated embodiment, the inward expansions 152 are spaced from each other in the first direction (vertically), leaving flat portions 154 therebetween. Each of the inward expansions 152 includes at least one opening 156 therein providing access to a logistics fitting mounting area 160 within the wall 14. As illustrated, each inward expansion 152 includes two openings 156 of rectangular shape centrally arranged between the flange portions 142, however, the openings 156 can be provided in alternate quantity, shape, and arrangement within the inward expansions 152.

Figure 3:
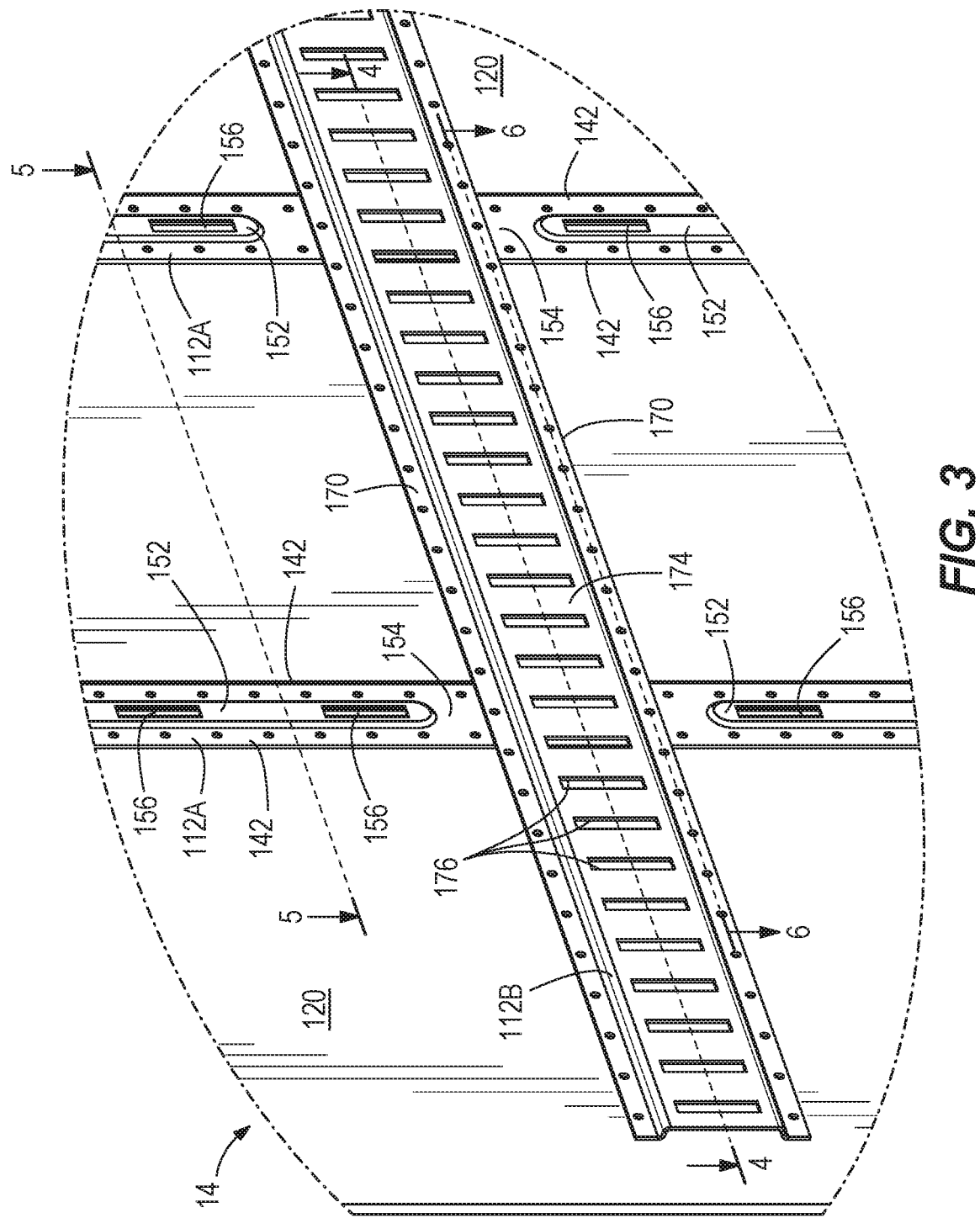
FIG. 3 is a detail view of a portion of the interior side of the wall as shown in FIG. 2.

With continued reference to the illustrated embodiment, the horizontal logistics track 112B is arranged to cross the vertical logistics track 112A at a position (e.g., along the flat portion 154) between the first and second inward expansions 152. Furthermore, as shown in FIG. 3, one of the horizontal logistics tracks 112B can overlie a group of two or more adjacent ones of the vertical logistics tracks 112A. Multiple horizontal logistics tracks 112B can be positioned end-to-end at a given height within the trailer 10. Moreover, horizontal logistics tracks 112B can be provided at two or more different heights on the wall 14 as shown in FIG. 2. In order to accommodate such an arrangement, each vertical logistics track 112A can include three or more of the inward expansions 152 separated by two or more flat portions 154, so that the height of the flat portions 154 define the attachment heights for the horizontal logistics tracks 112B.

Like the inward expansion portions of the vertical logistics track 112A, the illustrated horizontal logistics track 112B includes a hat-shaped profile in transverse cross-section. However, the horizontal logistics tracks 112B can have a consistent cross-section throughout all or a majority thereof, and need not necessarily have a hat-shaped or other non-planar profile. The profile of the illustrated horizontal logistics track 112B includes two edge flanges 170 and a raised central portion 174 therebetween. The raised central portion 174 has at least one opening 176 therein providing access to a logistics fitting accommodation area 180 (FIG. 4) that is situated between the raised central portion 174 and the interior plane P1. The horizontal logistics tracks 112B can be secured to the vertical logistics tracks 112A and/or to one or more of the wall panels 120 using one or both of adhesive and mechanical fasteners (e.g., rivets), for example.

The embodiments described above and illustrated in the figures are presented by way of example only, and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. Various features of the invention are set forth in the following claims.

What is claimed is:

1. A cargo body wall comprising:
an interior side defining an interior plane for facing a cargo receiving volume;
an exterior side opposite the interior side;
a primary logistics track elongated in a first direction and situated in the cargo body wall;
a secondary logistics track elongated in a second direction intersecting the first direction,
wherein the primary logistics track includes first and second inward expansions projecting inward of the interior plane, each of the first and second inward expansions having at least one opening therein providing access to a logistics fitting accommodation area within the cargo body wall, and
wherein the secondary logistics track is arranged to cross the primary logistics track at a position between the first and second inward expansions.

2. The cargo body wall of claim 1, wherein the exterior side and the interior side defining the interior plane are at least partially defined by one or more wall panels.

3. The cargo body wall of claim 1, wherein the cargo body wall has a height configured to extend in the first direction parallel to the primary logistics track, and the cargo body wall has a length exceeding the height and extending orthogonal to the first direction.

4. The cargo body wall of claim 1, wherein the primary logistics track has a flat portion at the position between the first and second inward expansions.

5. The cargo body wall of claim 4, wherein the flat portion of the primary logistics track lies in the interior plane.

6. The cargo body wall of claim 1, wherein the secondary logistics track has, in a cross-section taken perpendicular to the second direction, a hat-shape profile including two edge flanges and a raised central portion therebetween, the raised central portion having at least one opening therein providing access to a second logistics fitting accommodation area situated between the raised central portion and the interior plane.

7. The cargo body wall of claim 1, further comprising an additional primary logistics track situated in the cargo body wall parallel to and offset from the primary logistics track, wherein the primary logistics track forms part of a splice joint between respective edges of a first panel and a second panel, and the additional primary logistics track is positioned within the first panel.

8. The cargo body wall of claim 7, wherein, in a thickness direction of the cargo body wall orthogonal to the first and second directions, the additional primary logistics track overlies a continuous section of the first panel and is supported in a mid-panel recess on an interior side of the first panel.

9. The cargo body wall of claim 8, wherein the continuous section of the first panel includes an offset portion that forms an outward protrusion along the exterior side.

10. The cargo body wall of claim 1, wherein, within the first and second inward expansions, an entire material thickness of the primary logistics track is positioned inward of the interior plane.

11. The cargo body wall of claim 1, wherein the primary logistics track is a metal stamping.

* * * * *